United States Patent
Calzone et al.

(10) Patent No.: US 8,910,224 B1
(45) Date of Patent: Dec. 9, 2014

(54) APPLICATION AND SERVER BASED CONTROL OF DYNAMIC CHANNEL MAPPING

(75) Inventors: Steven J. Calzone, Johns Creek, GA (US); Philip Stroffolino, Media, PA (US)

(73) Assignee: Cox Communications, Inc., Atlanta, GA (US)

( * ) Notice: Subject to any disclaimer, the term of this patent is extended or adjusted under 35 U.S.C. 154(b) by 107 days.

(21) Appl. No.: 13/293,191

(22) Filed: Nov. 10, 2011

(51) Int. Cl.
| | |
|---|---|
| H04N 7/173 | (2011.01) |
| G06F 3/00 | (2006.01) |
| G06F 13/00 | (2006.01) |
| H04N 5/445 | (2011.01) |
| H04N 21/443 | (2011.01) |
| H04N 21/458 | (2011.01) |
| H04N 21/2668 | (2011.01) |

(52) U.S. Cl.
CPC ......... *H04N 21/458* (2013.01); *H04N 21/4431* (2013.01); *H04N 21/2668* (2013.01)
USPC .................................. 725/95; 725/44; 725/47

(58) Field of Classification Search
None
See application file for complete search history.

(56) References Cited

U.S. PATENT DOCUMENTS

| | | | | |
|---|---|---|---|---|
| 5,666,645 | A * | 9/1997 | Thomas et al. | 725/47 |
| 6,081,263 | A * | 6/2000 | LeGall et al. | 715/760 |
| 6,774,926 | B1 * | 8/2004 | Ellis et al. | 348/14.01 |
| 2003/0217369 | A1 * | 11/2003 | Heredia | 725/152 |
| 2007/0097907 | A1 * | 5/2007 | Cummings | 370/329 |
| 2008/0056299 | A1 * | 3/2008 | Kim | 370/465 |
| 2008/0141306 | A1 * | 6/2008 | Foti | 725/44 |
| 2011/0267945 | A1 * | 11/2011 | Shrum, Jr. | 370/233 |

* cited by examiner

*Primary Examiner* — Oschta Montoya
(74) *Attorney, Agent, or Firm* — Merchant & Gould P.C.

(57) ABSTRACT

A system, method and computer readable media for overcoming the inherent limitations on the number of possible channels in a channel map. An enhanced channel launch application is used for adding channels to a channel map. A network couples a headend to a conditional access device. The headend includes a profile services server and the conditional access device includes a channel addition interface. The channel addition interface is used by a user to add a channel to a channel map associated with the conditional access device, the channel addition interface adding the channel to the channel map when the channel addition interface receives user input to create the channel, the created channel being added to a channel map to create an modified channel map individualized for the user.

30 Claims, 6 Drawing Sheets

APPLICATION AND SERVER BASED CONTROL OF DYNAMIC CHANNEL MAPPING

FIELD OF THE INVENTION

This disclosure relates in general to the consumer control of channel mapping, and more particularly to a system and method for providing application and server based control of dynamic channel mapping.

BACKGROUND

An enhanced channel launch is implemented by configuring an asset in the video-on-demand (VOD) structure, wherein an associated channel points directly at that asset so that when that channel is selected by a user the content of the asset is displayed. The content associated with the asset may include video-on-demand assets or some number of other folders and assets within the video-on-demand sub directory. Enhanced channel launch controls how channels get created and substantiated.

With traditional broadcast video, the creation and maintenance of broadcast channels evolved to include video-on-demand based channels. However, the channel paradigm has a basic limitation on the number of channels and functionality that originated at the beginning of the system concept development. Those limitations have been perpetuated through the years. The channel number limitations have been addressed in various ways.

The original channel number design was based on memory limitations of the set-top box. Only a limited amount of non-volatile RAM was available to store channel maps and actual bit maps that represented features for each channel. Thus, an arbitrary number was selected based on the number of bits available to the application and non-volatile RAM used. In addition, there was a limitation regarding support of a maximum number channels based on a data field that was set by the controller software. Thus, a combination of controller code availability and DRAM in the set top created a limitation on the number of channels.

The configuration that resulted in channel number limitations was then hard coded into the different media platforms. Even though new hardware would have more DRAM and more non-volatile RAM, replacing the control system became extremely problematic. Some efforts to address these limitations have involved very specific and proprietary methods. However, such methods are not extensible to other platforms.

For example, many recently developed platforms cannot implement these proprietary methods. One relatively new platform is the Tru2way® platform, which was formerly known as OCAP (OpenCable Application Platform). The Tru2way® platform is based on a set of standards that is freely and widely available throughout the industry. Such industry companies may include players in the cable industry, consumer electronics manufacturers, and multiple systems operators (possibly even including satellite operators). The Tru2way® systems include a system control process that provides a specific mechanism of data delivery as well as for application development. In addition, subscribers are being provided a Tru2way® based programming guide, which is an electronic interactive programming guide.

While new features and interactivity are possible, such platforms still have a limited number of channels that may be used. The limitation on the number of channels deriving from the legacy channel numbering system needs to be surmounted. A numbering and/or symbolic naming system that is not constrained by these limitations as a mechanism of identifying and selecting channels is needed.

Accordingly, there is a need for a system and method for providing application and server based control of dynamic channel mapping.

SUMMARY OF THE INVENTION

To overcome the limitations described above, and to overcome other limitations that will become apparent upon reading and understanding the present specification, embodiments for a system and method for providing application and server based control of dynamic channel mapping are disclosed.

The above-described problems are solved by using an enhanced channel launch application for adding channels to a channel map. This application provides an indication when a new set of channels are available to the subscriber. The enhanced channel launch application thus overcomes the limited channel constraints.

An embodiment includes a system for providing server based control of dynamic channel mapping. The system includes a headend for providing content to a subscriber, a conditional access device disposed at a subscriber's premise and a network coupling the headend to the conditional access device, wherein the headend includes a profile services server and the conditional access device includes a channel addition interface for a user to add a channel to a channel map associated with the conditional access device, the channel addition interface adding the channel to the channel map when the channel addition interface receives user input to create the channel, the created channel being added to a channel map to create an modified channel map individualized for the user.

In another embodiment, a method for providing server based control of dynamic channel mapping is disclosed. The method includes presenting a user menu for adding a channel to a channel map, receiving a request for adding a channel at the user menu, receiving a channel designator via the user menu to associate with the requested channel to be added, creating a new channel in response to the request for adding a channel and adding the created channel to a channel map to create a modified channel map individualized for the user.

A computer readable medium including executable instructions which, when executed by a processor, provides server based control of dynamic channel mapping is disclosed. The processor executes instructions by presenting a user menu for adding a channel to a channel map, receiving a request for adding a channel at the user menu, receiving a channel designator via the user menu to associate with the requested channel to be added, creating a new channel in response to the request for adding a channel and adding the created channel to a channel map to create a modified channel map individualized for the user.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments are directed to a system and method for providing application and server based control of dynamic channel mapping.

Figure 1:
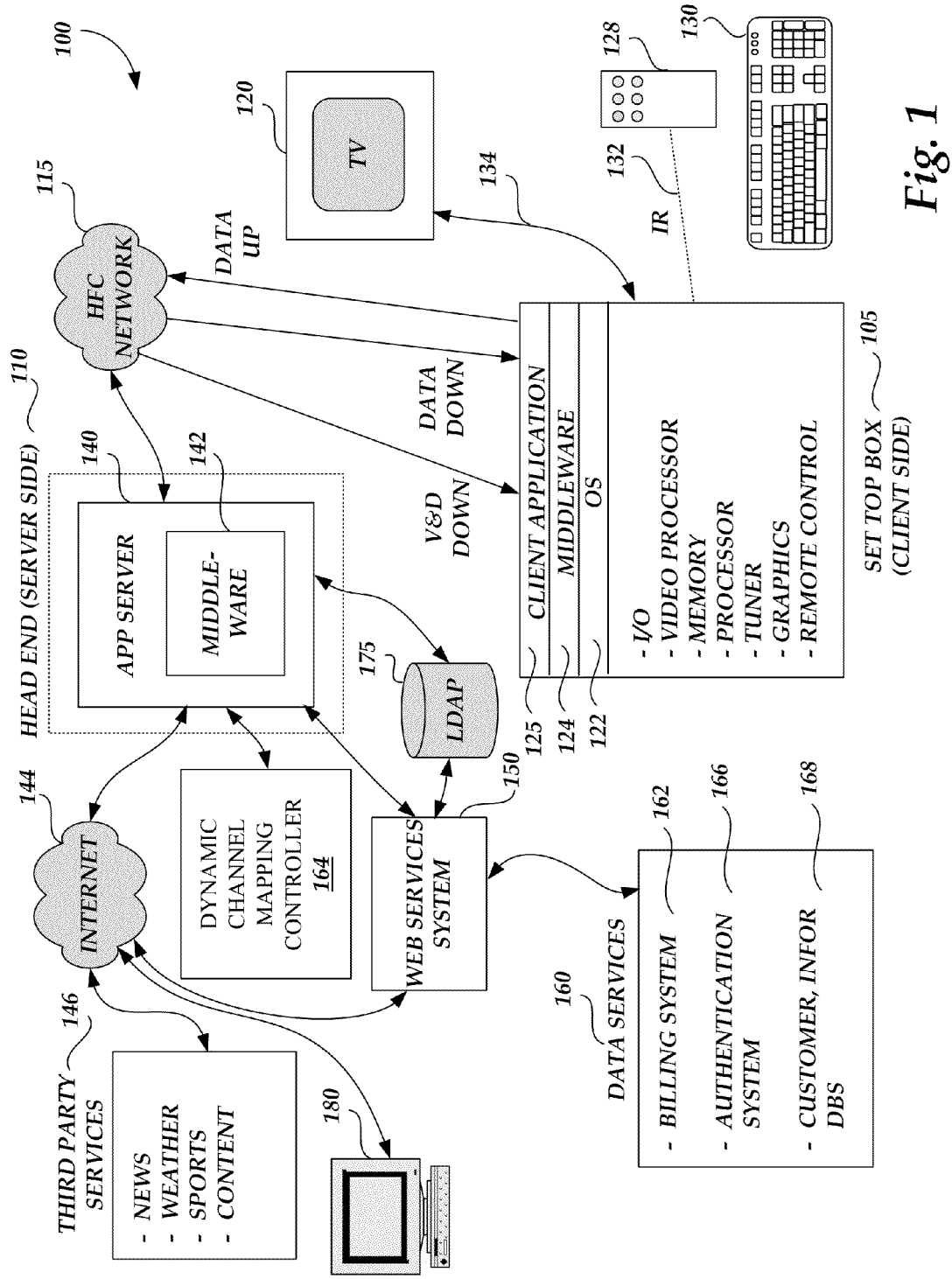
FIG. 1 is a simplified block diagram illustrating a cable television/services system (hereafter referred to as "CATV") architecture that serves as an exemplary operating environment for the present invention.

FIG. 1 is a simplified block diagram illustrating a cable television/services system 100 (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 11 5 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way or two-way IP-based communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" (IB) signaling space normally operates at a frequency that may be between 54 and 860 megahertz. The signaling space between 54 and 860 megahertz is generally divided into 6 megahertz channels in which may be transmitted a single analog signal or a greater number (e.g., up to ten) digital signals. Additional frequency allocations are also known to those skilled in the art to operate at frequencies above 860 MHz or below 54 MHz. This application does not preclude the use of IB frequencies beyond the normal operating frequency range of 54 to 860 MHz.

The data downlink and the data uplink, illustrated in FIG. 1, between the HFC network 115 and the set-top box 105 comprise "out of band" data links. As is understand by those skilled in the art, the "out of band" (OOB) frequency range generally lies between zero and 54 megahertz. Additional frequency allocations are also known to those skilled in the art to operate at frequencies above 54 MHz. This application does not preclude the use of OOB frequencies beyond the normal operating frequency range above 54 MHz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 11 5 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

A dynamic channel mapping controller 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate services systems 162, 164, 166, 168 are illustrated as a collection of services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
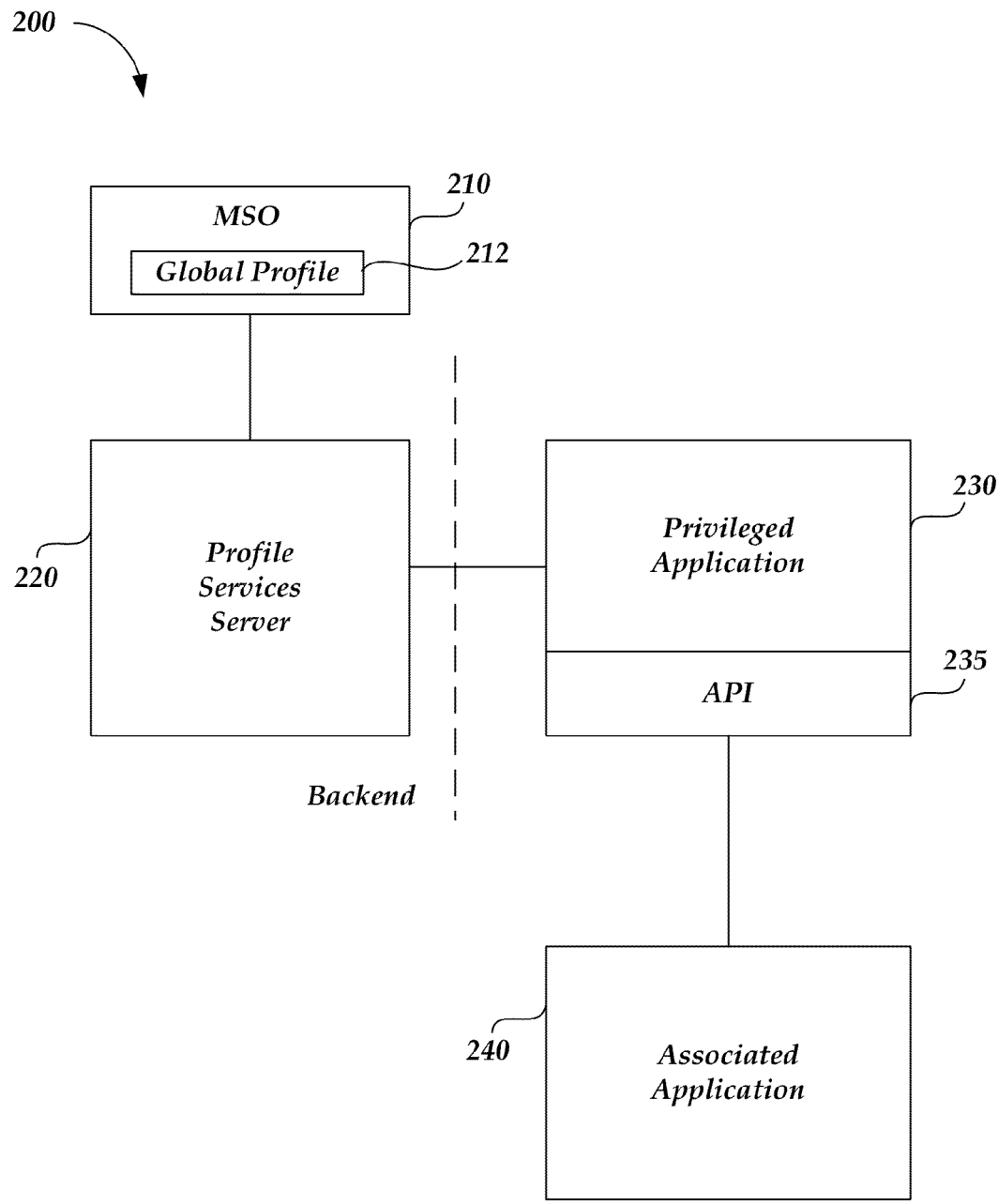
FIG. 2 shows the dynamic channel application architecture in the tru2way environment according to one embodiment.

FIG. 2 shows the dynamic channel application architecture 200 in the tru2way environment according to one embodiment. Rather than replacing controls to supporting enhanced channel launch for video-on-demand channels, controls are supplemented. An application may add a channel that the application creates in a programmatic way thereby dynamically allowing the application to add and remove channels under application control including and not limited to applications running on the controllers themselves. Also included are applications that are running on the set-top boxes. Thus, an application running on the set-top box may designate a new channel based on simply loading the channel. The application indicates that a new set of channels are available to the end user or the subscriber.

Dynamic channel substantiation may include designating a channel as an application that is loaded, e.g., a YouTube channel. This dynamic channel does not need to be numbered, but the subscriber may choose to designate the dynamic channel using a channel designator, such as a number or symbolic name chosen by the subscriber. Further, this channel designator is not limited by the previous channel number limitation. The only constraints are logical, e.g., it would be confusing to have duplicate channel numbers or symbolic names.

The first part of the Tru2way® system is the delivery of applications to the set-top box. Normally, in a Tru2way® system, applications are delivered as an eXtended Application Information Table (XAIT) that is used for launching and managing the lifecycle of unbound applications. The XAIT actually maintains a list of the applications that are destined for each instance of a Tru2way® implementation, regardless of whether it is a set-top box (STB), a PC, etc. that is running the Tru2way® implementation. This XAIT is identified by the actual name of the application, the set of parameters associated with the application, and possibly other information that the application might need to perform various functions. Once the application is delivered to the end device, i.e., the end user device through this XAIT in a Tru2way® system, the application itself is launched, loaded, and initiated. The application is provided with instructions to allow the application to execute functions associated with the application.

Applications have various limitations, e.g., some applications are more powerful than others, have a higher priority and can execute and do more things in the system than others. In this specific instance, dynamic channel generation using application capabilities may be a more privileged application. However, the notion that any application can create its own channels is still available. This means that the privilege application may be in control of which applications are able to create their own channels. Thus, there is a privilege application 230 which includes an API 235 that advertises to a second associated application 240 which can then request that the first privileged application 230 create a channel for the associated application 240. The privileged application 230 permits this type of functionality and verifies with the profile services server 220 whether it has the rights to create the requested channels.

As an example, a music channel application may want to create a set of music channels associated with a particular genre, e.g., rock and rap. The creation of these channels may be accomplished dynamically because only channels for the requested genres, e.g., rock and rap, are created and it is not interested in channels for other genres. Thus, the user would be able to set up application-based channels that are specific to the users' preferences through the music channel application. All of this may be accomplished at the client side for the user. However, the associated application 240 that gets downloaded can actually create channels on the fly based on user preferences stored in the profile services server 220.

User preferences may be stored in and accessed from a profile services server 220 that may be maintained at a central location. Profile services 220 may be prepared in the backend of the system. The backend mechanism also enables the MSO 210 to actually create channels. Thus, both MSO 210 and user generated (via associated application 240) channel creation methods may be implemented. Each user may get an individualized set of channels based on their customer preferences as outlined in the profile preferences server 220, while the MSO 210 may use a mechanism to limit the user to use of certain channels and to adhere to certain application definitions. The limit may be determined by a global profile 212, which may be site-specific or user-specific, provided by the MSO 210.

Figure 3:
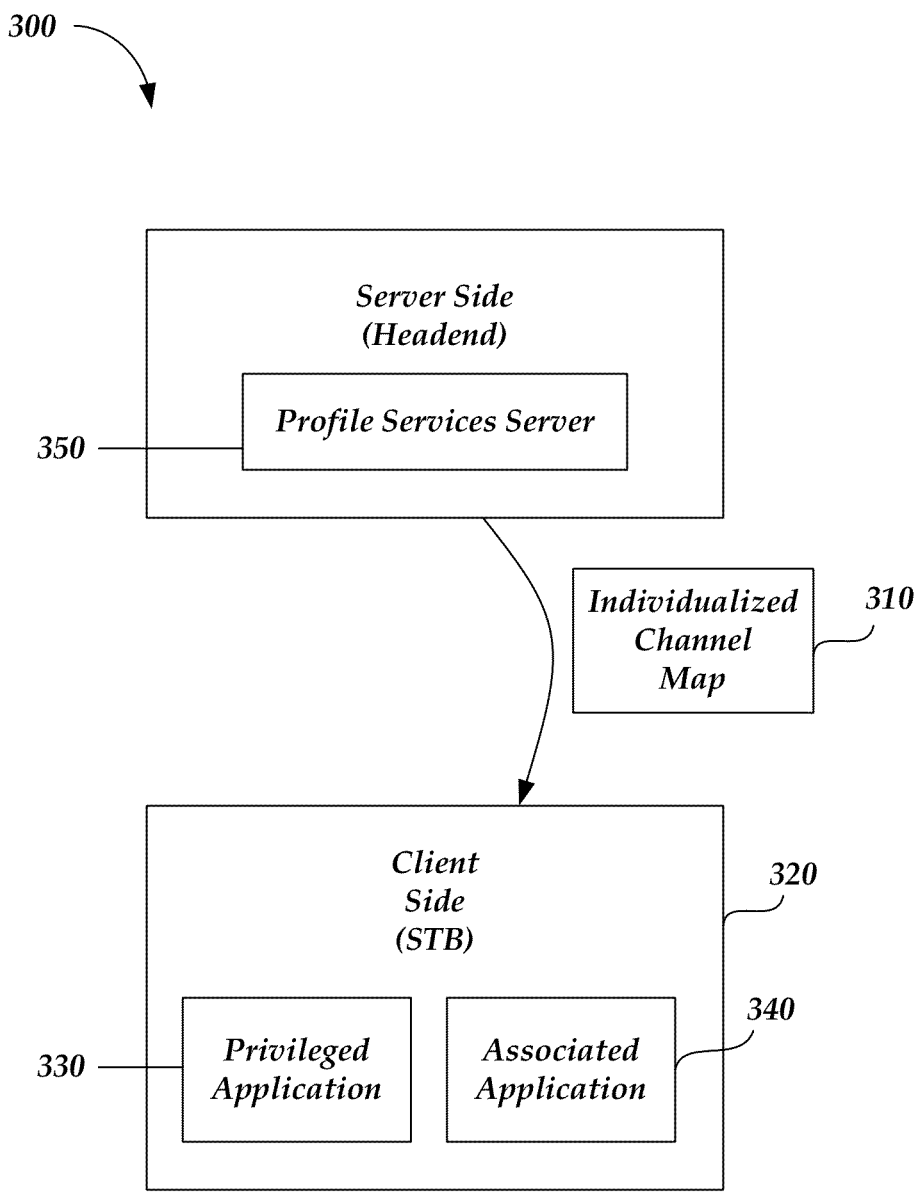
FIG. 3 illustrates channel loading in a client/server model according to one embodiment.

FIG. 3 illustrates channel loading in a client/server model 300 according to one embodiment. An individualized channel map 310 may be loaded dynamically when the STB 320 boots or as the STB 320 already operating. In addition, a privileged application 330 may create associations dynamically with an associated application 340 when the STB 320 is operating. The profile services server cluster 350, which is called by the privileged application 330, includes intelligence for controlling how channels are created.

Figure 4:
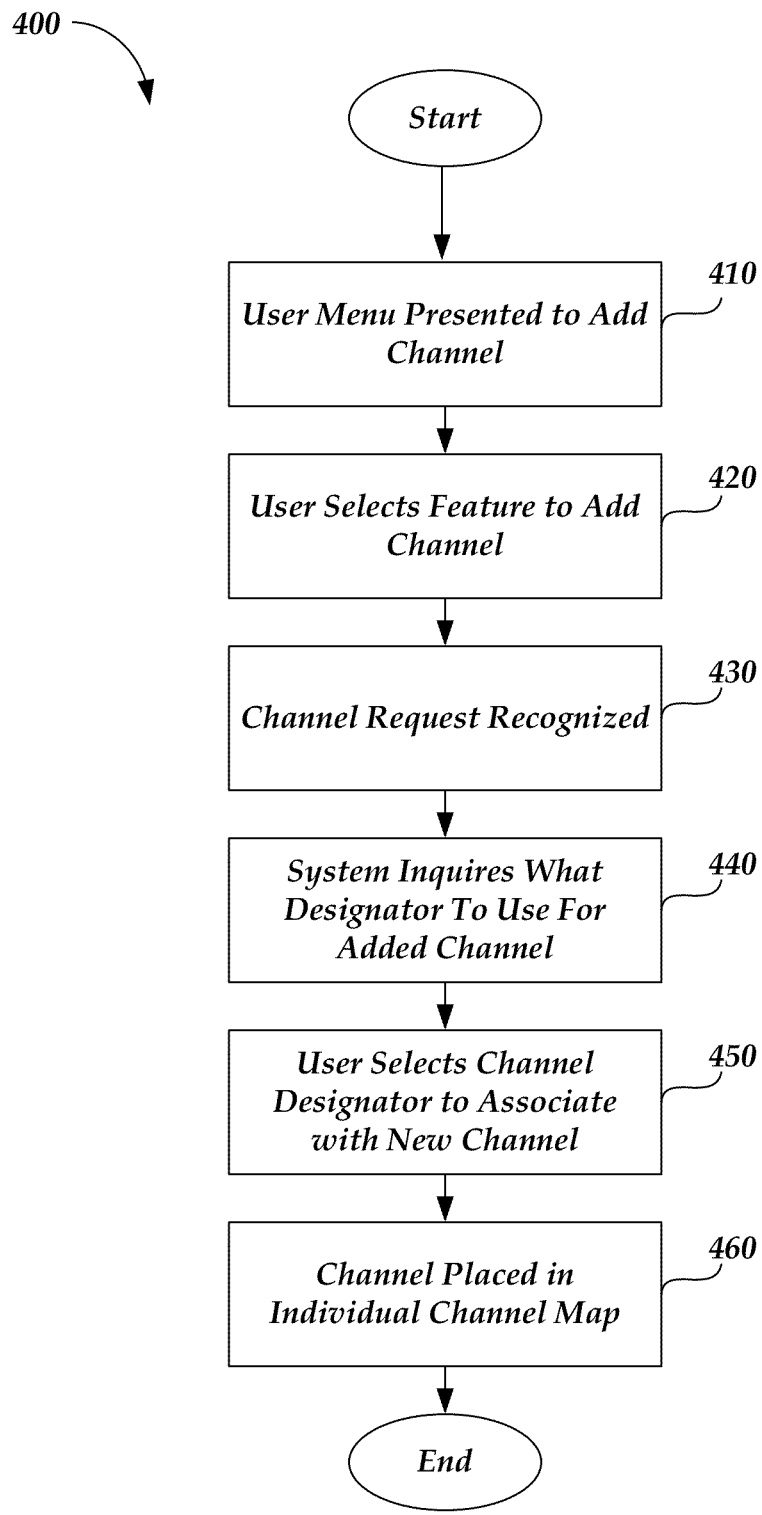
FIG. 4 shows a flowchart for adding a preference (i.e. channel) to a configuration according to one embodiment.

FIG. 4 shows a flowchart for adding a preference (i.e. channel) to a configuration 400 according to one embodiment. A user may be presented with a menu to add a preference to a configuration 410. For example, this preference may be adding a channel. To add this preference, the user selects a new feature to be added to their configuration 420. Ordinarily, this would be a channel in excess of what the system can support, i.e., it would be a channel number beyond 4095, or not a number at all but a symbolic name. The system according to an embodiment recognizes the request 430. For example, a channel 9999 may be implemented; there is no maximum channel number. The application is completely unaware of the previous channel mapping at the controllers and its channel limitations. The system may inquire from the user what channel designator, e.g., number or other representation, the user wants to assign to the new channel 440. A specific range of channel numbers, names, symbols, etc. may be provided to the user for selection. The user selects the channel designator, e.g., channel number, name, etc., to be associated with the new channel 450. The user is thus able to create a preferred individual channel association through the menu driven system to indicate acceptance to the channel designator and placement of the channel. This channel substantiation is placed in the designated location in the user's channel map 460, thus creating or updating their individualized channel map. This channel may also be designated as a "Favorite" so that when the user selects the "Favorites" button, the new channel is loaded.

All the applications will work across the system, i.e., the guides, third party applications, etc. Content provision for the new channel depends on the kind of channels that is created. Not all channels are video channels that display video. Different types of channels have different channel needs.

Using YouTube video as an example, there would be a linkage set up between the actual YouTube server using the system backbone to create a linkage and allow the content to stream through standard protocols (e.g. RTSP) that may be involved in streaming of content from an external source into the system. Then that linkage would actually exist through our system, not just through the backbone, but also directly into the multiplexors where that content could be selected. In the case of "Rap" music, the content may actually be coming off the video-on-demand server. The content is already available from within the system.

Figure 5:
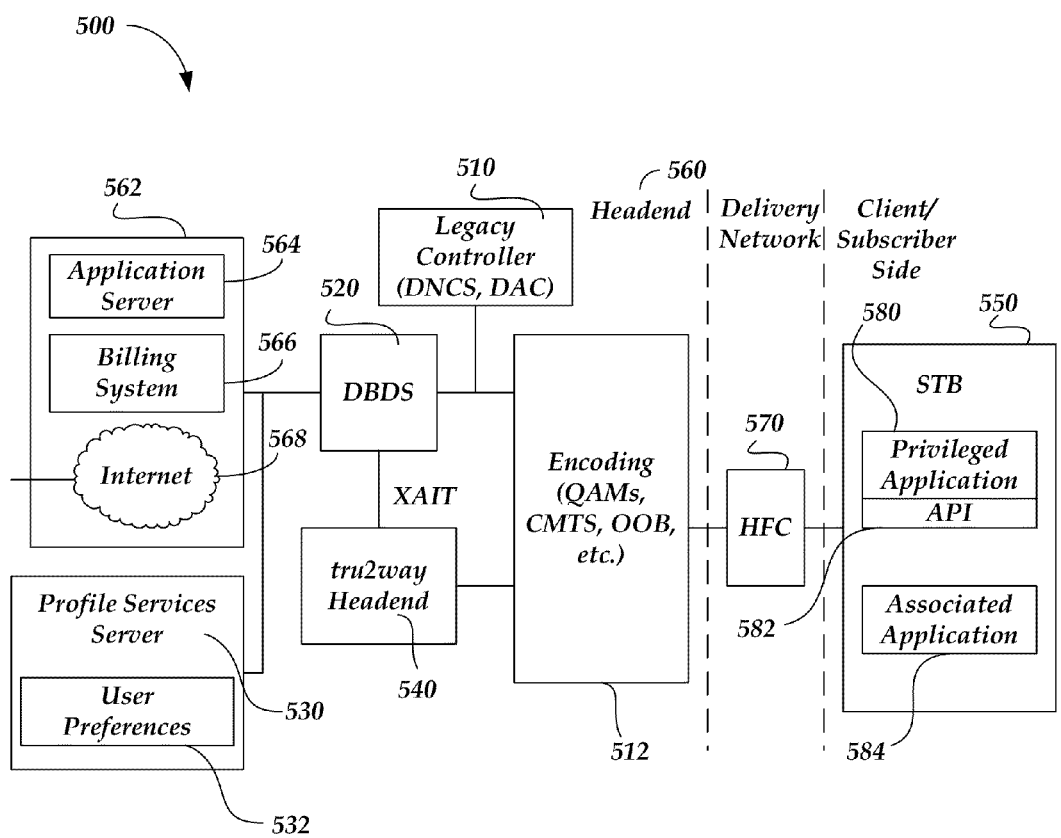
FIG. 5 shows a block diagram of the overall channel launch system according to one embodiment.

FIG. 5 shows a block diagram of the overall channel launch system 500 according to one embodiment. Embodiments provide for handling virtual channel definitions numbered 2000 and above or arbitrarily named, including support for any channel type, including broadcast and application launch channels (e.g. SD, HD, SDV, VOD, VOD ECL channels, Mosaics, Games, etc). The Legacy Controller 510 located in the Headend 560 uses a Digital Network Control System (DNCS) or a Digital Addressable Controller (DAC) system to monitor, control, and coordinate all communications, including video, audio, and data. The Digital Broadband Delivery System (DBDS) 520 receives analog and digital services from a variety of sources including satellite and securely transports the services over the Delivery Network 570 to the subscriber's home. The DBDS 520 is also coupled to the headend server 562, which includes or is coupled to an application server 564, billing system 566 and Internet access 568. Services supported by the DBDS 520 are controlled by the DNCS 510. The DAC provides a control system for the cable headend. The channel map in a DAC system can manage up to 4096 channels. The channel map in the DNCS can manage up to 2000 channels.

To indicate mapping for a new channel, system information is delivered from the legacy controllers 510 and is merged with the new information from the profile services system 530. The profile services system 530 also includes user preferences 532. The merging can occur in two places. The merging may occur in the Tru2way® controller 540 that has access to both the legacy controller 510 and the profile services controller 530. Alternatively, the merging may occur on the STB 550 through an OCAP core services layer (CSL, also referred to as OSL). The privileged application 580 communicates with the OSL to create the new channel and then instructs the Tru2way® controller 540 and the profile services controller 530 that a new channel has been created for the subscriber at this location. The legacy controller 510 is unaware of the new channel. The encoding 512 is handled in the headend 560.

Embodiments supporting enhanced channel launch (ECL) for video-on-demand channels thus require changes to the management of channels of the system controllers (both DAC and DNCS) 510 to provide support for the use of channels beyond their current limits. Currently the CSL (Core Services Layer) maintains a methodology for channel map processing based on (in priority): Service Information (SI) data; and Core Video Platform (CVP) data. Service Information (SI) data describes the TV services available on the network. OCAP (OpenCable Application Platform) service information is defined by the SCTE 65 standard. CVP (Core Video Platform) data provides content screening through an interface mechanism providing communications with servers to validate the content and to allow modifications. Virus and other security related screening may also be provided through the CVP content server. The CVP content server, or Navigation (Nav) server retrieves SI data from the controller and then Tribune Media Services data (from TMS data feed), and constructs a channel map that gets delivered to the OSL. The OSL maintains a channel map that gets delivered to the SCIN application using OSL APIs. If the channel is not defined in the SI data from the controller then the channel does not show up in the channel map.

The ECL privileged application 580 defines a channel and injects it into the OSL using the OSL API 582. More specifically, the associated application 584 may retrieve data regarding application channel definitions. The privileged application 580 then calls an API 582 to insert the channel data into the channel map. This OSL does not change its methodology for channel map management. However, the timing of OSL data retrieval for managing SI and CVP data must be maintained. The application 580 controls how channels are mapped and dynamically add/remove channels from a channel map. All application-defined channels are forced to follow rules for parental control, favorites, scheduling, etc., as maintained by the OSL.

The channel map data is injected at the server where the OSL client reads the CVP server channel map first and then overrides it with SI data. Therefore, the definitions may be configured at the CVP Nav server whereby the SI definitions would not conflict with any CVP channel definitions and would also properly override the TMS source short descriptions with local short descriptions. These configurations may be combined so that the application configured channel map data could presumably be overridden by the SI data. This provides the most flexibility as well as a desired final outcome. However, the complexities of timing the channel map updates from SI, CVP, and application data becomes critical in this scenario.

Alternative options include maintaining separate channel map for ECL channels over 1999 and modifying the controller channel map to uniquely identify ECL channels. Maintaining separate channel map for ECL channels over 1999 solely works for supporting the ECL channels only. The application retrieves the list of channels from the OSL and the CSL profile. The application then maintains its own channel map that combines those channel maps. However, parental controls or other OSL-related channel map functionality are not accounted for.

As mentioned, modifications may be made to the controller channel map to uniquely identify ECL channels. This would use channels in the range below 2000, but uniquely identify those channels so that they could be remapped to channels above 2000. However, this has the drawback of requiring maintenance changes to the controller itself as well as non-standard naming and limitations in the number of characters available on the controller (e.g. the DNCS only has a 5 character string for channel short description).

Figure 6:
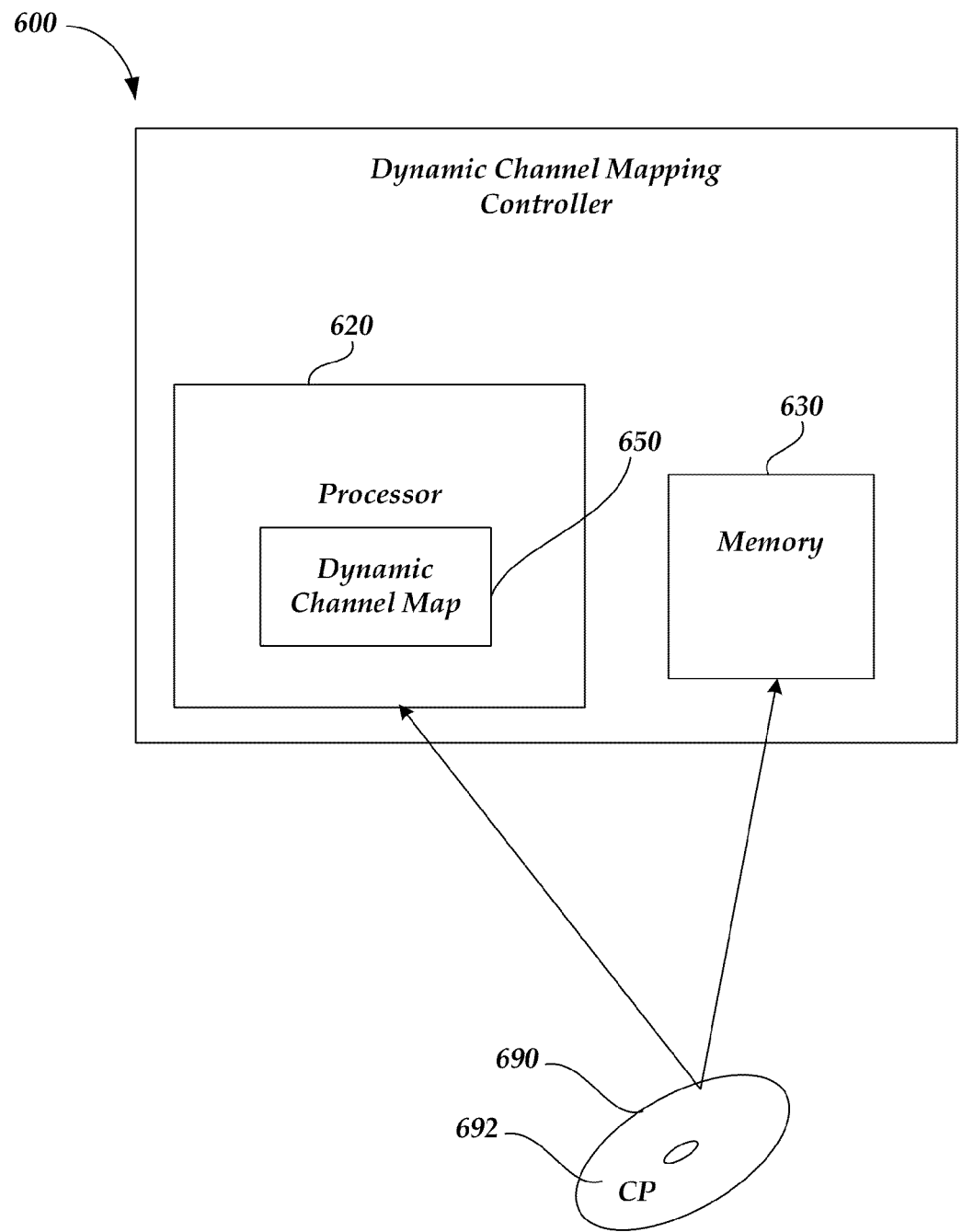
FIG. 6 illustrates a suitable computing environment for implementing a system as described above in FIGS. 1-5 according to an embodiment.

FIG. 6 illustrates a suitable computing environment 600 for implementing a system as described above in FIGS. 1-5 according to an embodiment. In FIG. 6, a dynamic channel mapping controller 600 includes a processor 620 and memory 630. Those skilled in the art will recognize that the dynamic channel mapping controller 600 may be implemented in a head end module, a session resource manager, and other data/content control devices. Embodiments may also be implemented in combination with other types of computer systems and program modules. Generally, program modules include routines, programs, components, data structures, and other types of structures that perform particular tasks or implement particular abstract data types. By way of example, computer readable media 690 can include computer storage media or other tangible media. Computer storage media 690 includes volatile and nonvolatile, removable and non-removable media implemented in any method or technology for storage of information 692, such as computer readable instructions, data structures, program modules or other data. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 690 may refer to a mass storage device, such as a hard disk or CD-ROM drive. However, it should be appreciated by those skilled in the art that tangible computer-readable media can be any available media that can be accessed or utilized by a processing device, e.g., server or communications network provider infrastructure.

By way of example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device (e.g. USB stick, etc.).

As mentioned briefly above, a number of program modules and data files may be stored and arranged for controlling the operation of processing devices. Thus, one or more processing devices 620 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 630 thus may store the computer-executable instructions that, when executed by processor 620, cause the processor 620 to implement a dynamic channel mapping controller 600 according to an embodiment of the invention as described above with reference to FIGS. 1-5.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing server based control of dynamic channel mapping, comprising:
   a headend for providing content to a subscriber, the headend including a profile services server;
   a conditional access device disposed at a subscriber's premise; and
   a network coupling the headend to the conditional access device;
   wherein the conditional access device includes a privileged application and an associated application, the associated application retrieves channel data from the profile services server, the privileged application calls an API to insert the application channel data into the channel map and a channel addition interface for adding a channel to a channel map associated with the conditional access device, the channel addition interface adding the channel to the channel map when the channel addition interface receives a request from the associated application to create the channel, the created channel being added to a channel map to create an modified channel map individualized for the user.

2. The system of claim 1, wherein the conditional access device comprises a set-top box (STB), the STB loading the individualized channel map upon booting of the STB.

3. The system of claim 2, wherein the STB is used to merge the system information with information from the profile services server.

4. The system of claim 1, wherein the privileged application calls the profile services server, the profile services server controlling channel creation at the headend.

5. The system of claim 1, wherein the channel addition interface configures an asset in a video-on-demand (VOD) structure when the channel addition interface receives the user input to create the channel, the associated channel pointing directly at the configured asset to display the asset content when the created channel is selected by a user.

6. The system of claim 1, wherein a new channel designator is placed in the individualized channel map.

7. The system of claim 1, wherein the channel addition interface removes a channel upon receiving a removal request.

8. The system of claim 1, wherein the channel addition interface indicates to the user that a new set of channels are available.

9. The system of claim 1, wherein the created channel comprises a dynamic channel providing an application for selection by the user to execute functions associated with the application.

10. The system of claim 9, wherein the dynamic channel is not associated with a channel number or symbolic name.

11. The system of claim 9, wherein the subscriber selects a channel designator for designating the dynamic channel.

12. The system of claim 9, wherein the application provided for selection by the user comprises an eXtended Application Information Table (XAIT) for launching and managing unbound applications, and for maintaining a list of the applications for each implemented instance of a platform.

13. The system of claim 12, wherein the XAIT is identified by the name of the application, the set of parameters associated with the application, and information required to perform functions associated with the application.

14. The system of claim 1, wherein the headend includes a legacy controller delivering system information to indicate mapping for new channels, the system information being merged with information from the profile services server.

15. The system of claim 1, wherein the headend includes a Tru2way® controller, the Tru2way® controller merging the system information with information from the profile services system.

16. The system of claim 1, wherein the channel addition interface supports enhanced channel launch (ECL) for video-on-demand channels by extending support for channels beyond the predetermined number allowed by a legacy controller.

17. A method for providing server based control of dynamic channel mapping, comprising:
   retrieving application channel definitions from a profile services server;
   calling an API to insert the application channel data into a channel map;
   presenting a user menu, by an associated application, for adding a channel to the channel map;
   receiving a request for adding a channel at the user menu;
   receiving a channel designator via the user menu to associate with the requested channel to be added;
   communicating the request for adding the channel to the privileged application;
   creating, by the privileged application, a new channel in response to the request for adding the channel; and
   adding the created channel to a channel map to create a modified channel map individualized for the user.

18. The method of claim 17 further comprising providing an extended channel launch application to a conditional access device for use in presenting the user menu for adding a channel to a channel map.

19. The method of claim 17, wherein the presenting the user menu comprises executing a privileged application having control to create a channel associated with the application.

20. The method of claim 19, wherein the executing the privileged application includes communicating, by the privileged application, with a profile services server at a headend to determine whether the privileged application has the rights to create the channel requested by the associated application.

21. The method of claim 20, wherein the creating the new channel comprises identifying user preferences stored in the profile services server and creating the channel based on the user preferences stored in the profile services server.

22. The method of claim 17, wherein the receiving of a request for adding a channel further comprises receiving at a profile services server a request for adding a channel from a backend system communicating with the profile services server.

23. The method of claim 17, wherein receiving at a profile services server a request for adding a channel from a backend system communicating with the profile services server comprises providing to the profile services server a predetermined global profile to limit channels for a user.

24. A computer readable storage device including executable instructions which, when executed by a processor, provides server based control of dynamic channel mapping, by:
retrieving application channel definitions from a profile services server;
calling an API to insert the application channel data into a channel map;
presenting a user menu, by an associated application, for adding a channel to the channel map;
receiving a request for adding a channel at the user menu;
receiving a channel designator via the user menu to associate with the requested channel to be added;
communicating the request for adding the channel to the privileged application;
creating, by the privileged application, a new channel in response to the request for adding the channel; and
adding the created channel to a channel map to create a modified channel map individualized for the user.

25. The computer readable storage device of claim 24 further comprising providing an extended channel launch application to a conditional access device for use in presenting the user menu for adding a channel to a channel map.

26. The computer readable storage device of claim 24, wherein the presenting the user menu comprises executing a privileged application having control to create a channel associated with the application.

27. The computer readable storage device of claim 26, wherein the executing the privileged application includes communicating, by the privileged application, with a profile services server at a headend to determine whether the privileged application has the rights to create the channel requested by the associated application.

28. The computer readable storage device of claim 27, wherein the creating the new channel comprises identifying user preferences stored in the profile services server and creating the channel based on the user preferences stored in the profile services server.

29. The computer readable storage device of claim 24, wherein the receiving a request for adding a channel further comprises receiving at a profile services server a request for adding a channel from a backend system communicating with the profile services server.

30. The computer readable storage device of claim 24, wherein receiving at a profile services server a request for adding a channel from a backend system communicating with the profile services server comprises providing to the profile services server a predetermined global profile to limit channels for a user.

* * * * *